(12) United States Patent
Hung

(10) Patent No.: US 12,233,512 B2
(45) Date of Patent: Feb. 25, 2025

(54) VISE WITH A CLAMPING FORCE DIGITAL DISPLAY MECHANISM

(71) Applicant: Safeway Machinery Industry Corporation, Taichung (TW)

(72) Inventor: Yi-Po Hung, Taichung (TW)

(73) Assignee: Safeway Machinery Industry Corporation, Taichung (TW)

( * ) Notice: Subject to any disclaimer, the term of this patent is extended or adjusted under 35 U.S.C. 154(b) by 330 days.

(21) Appl. No.: 18/079,921

(22) Filed: Dec. 13, 2022

(65) Prior Publication Data

US 2024/0189964 A1   Jun. 13, 2024

(51) Int. Cl.
*B25B 1/00* (2006.01)
*B25B 1/02* (2006.01)
*B25B 1/24* (2006.01)
*G01L 5/00* (2006.01)

(52) U.S. Cl.
CPC .................. *B25B 1/24* (2013.01); *B25B 1/02* (2013.01); *G01L 5/0071* (2013.01)

(58) Field of Classification Search
CPC .... B25B 1/00; B25B 1/20; B25B 1/10; B25B 1/2452
See application file for complete search history.

(56) References Cited

U.S. PATENT DOCUMENTS

| 6,758,098 B1* | 7/2004 | Nunnelee | B25B 5/16 73/761 |
| 2006/0162178 A1* | 7/2006 | Freidin | G01B 3/18 33/784 |
| 2020/0230797 A1* | 7/2020 | Frenken | B25F 5/00 |
| 2020/0264080 A1* | 8/2020 | de la Torre | G01N 3/02 |
| 2022/0250211 A1* | 8/2022 | Huang | B25B 1/18 |
| 2024/0189964 A1* | 6/2024 | Hung | G01L 5/0071 |

* cited by examiner

*Primary Examiner* — Lee D Wilson
(74) *Attorney, Agent, or Firm* — Ying-Ting Chen; Law Office of Michael Chen

(57) ABSTRACT

A vise with a clamping force digital display mechanism includes a screw support seat equipped with sensor and digital display design. Through the action of the operator continuously turning the vise handle, the movable jaw will generate a reaction force on the screw when clamping the workpiece, and the reaction force will be transmitted to the screw support seat through the screw. Then the sensor senses the deformation or displacement of the screw support seat and generates a signal and feeds it back to the digital display design, so that the digital display device displays the value of the clamping force at the time of the vise after processing and calculation.

8 Claims, 5 Drawing Sheets

VISE WITH A CLAMPING FORCE DIGITAL DISPLAY MECHANISM

BACKGROUND OF THE INVENTION (a) Field of the Invention

The invention relates to the technical field of vises, in particular to a vise with a clamping force digital display mechanism, which can instantly sense and display the value of the clamping force of the vise.

(b) Description of the Prior Art

The structure and operation mode of the existing vise are shown in FIG. 1. Put a workpiece 200 within the range of the opening between the jaws on the vise body 101 of a vise 100. When the operator rotates a handle 102 at the rear end of the vise 100, it can synchronously drive a screw 103 to rotate, and the screw 103 drives a nut seat 104 and a movable jaw 105 move toward the workpiece 200. When the clamping surfaces of the movable jaw 105 and the fixed jaw 106 are against and clamped to the workpiece 200, the operator continues to turn the handle 102 to activate a supercharging mechanism 107 connected to the rear end of the screw 103. The supercharging mechanism 107 is generally an oil pressure supercharging mechanism, a mechanical multi-force supercharging mechanism, an air pressure supercharging mechanism or a screw supercharging mechanism or other structures, etc., which can continue to push the screw 103, so that the movable jaw 105 can move toward the fixed jaw 106 to generate pressure and clamp the workpiece.

Whether the clamping force of the vise 100 on the workpiece 200 is sufficient or not is generally determined by the operator according to his work experience or the feel when turning the handle 102. However, the clamping force of the vise 100 on the workpiece 200 depends on factors such as machining cutting volume, tool feed rate, structural strength and material of the workpiece. Judging the clamping force based on work experience or hand feeling alone will inevitably lead to human error and misjudgment. Because the experience and feel are personal subjective and abstract feelings, and will vary from person to person, it is easy to cause the clamping force of the vise to be inappropriate, and the workpiece may vibrate, shift or loosen during the subsequent processing. In addition, if the clamping force of the vise is too large to cause elastic deformation of the workpiece, when the workpiece is removed from the vise after processing, after the elastic deformation returns to its original shape, machining errors such as dimensional errors and shape errors will directly occur, affecting to the quality of the workpiece. For this reason, how to improve the disadvantage that the clamping force cannot be known when the conventional vise is operated is the subject to be actively overcome by the present invention.

For known vise technology, please refer to technology: U.S. Pat. Nos. 2,771,803A, 9,095,958B2, 6,773,003B2, 6,053,490A.

SUMMARY OF THE INVENTION

It is the main object of the present invention to provide a vise with a clamping force digital display mechanism, which can instantly sense and display the value of the clamping force of the vise clamping workpiece through the sensor and digital display device installed in the vise to improve the disadvantage of the conventional vise that cannot display the clamping force, so that the operator can immediately see the value of the clamping force of the vise with his eyes, thereby achieving precise numerical display of the clamping force, ensuring that the vise can firmly clamp the workpiece and preventing the clamping force from being too large or too small.

It is another object of the present invention to provide a vise with a clamping force digital display mechanism, wherein through the design of the digital display device, it can be installed on the screw support seat of the existing vise, and the value of the clamping force of the vise can be displayed at an easier viewing position, and it can be installed and applied to the existing vise.

To achieve these and other objects of the present invention vise with a clamping force digital display mechanism comprises a vise, a sensor and a digital display device. The vise comprises a vise body, two jaws set on the vise body for clamping a workpiece, a screw support seat incorporated in a back end of the vise body and a screw rotatably mounted on the screw support seat. When the screw turns, the screw drives at least one jaw to move on the vise body. The sensor is set on the screw support seat of the vise and used to sense the deformation or displacement that occurs when the screw drives the jaws to clamp the workpiece from the screw reaction force back to the screw support seat and continuously detect and generate a signal. The digital display device is connected to the sensor through a signal line. The digital display device is used to continuously receive the signal of the sensor, and display the clamping force value of the vise at that time after processing the signal.

The vise with a clamping force digital display mechanism of the present invention can achieve the following effects:

1. It shows the value of the clamping force of the vise: The present invention can provide the operator with the sensor to sense the amount of deformation or displacement that occurs when the screw drives the two jaws or one of the jaws is clamped to the workpiece from the reaction force of the screw back to the screw support seat, so that the sensor generates a signal to feed back to the digital display device. Then, through the control unit of the digital display device, the value of the clamping force of the vise can be obtained, and the display unit composed of LCD, LED or OLED or other displays can display the value of the clamping force of the vise at that time.

2. It's easier to watch the values: The digital display device of the present invention is combined with the structure of the screw support seat through its casing, so that the digital display device is located in the position and direction adjacent to the operator, so that the operator can more easily watch the value of the clamping force of the vise while turning the handle of the vise.

3. It can be installed on the existing vise: The present invention can install the independent digital display device and the sensor on the existing vise, so that the existing vise can realize the clamping force digital display function.

DETAILED DESCRIPTION OF THE PREFERRED EMBODIMENTS

Figure 1:
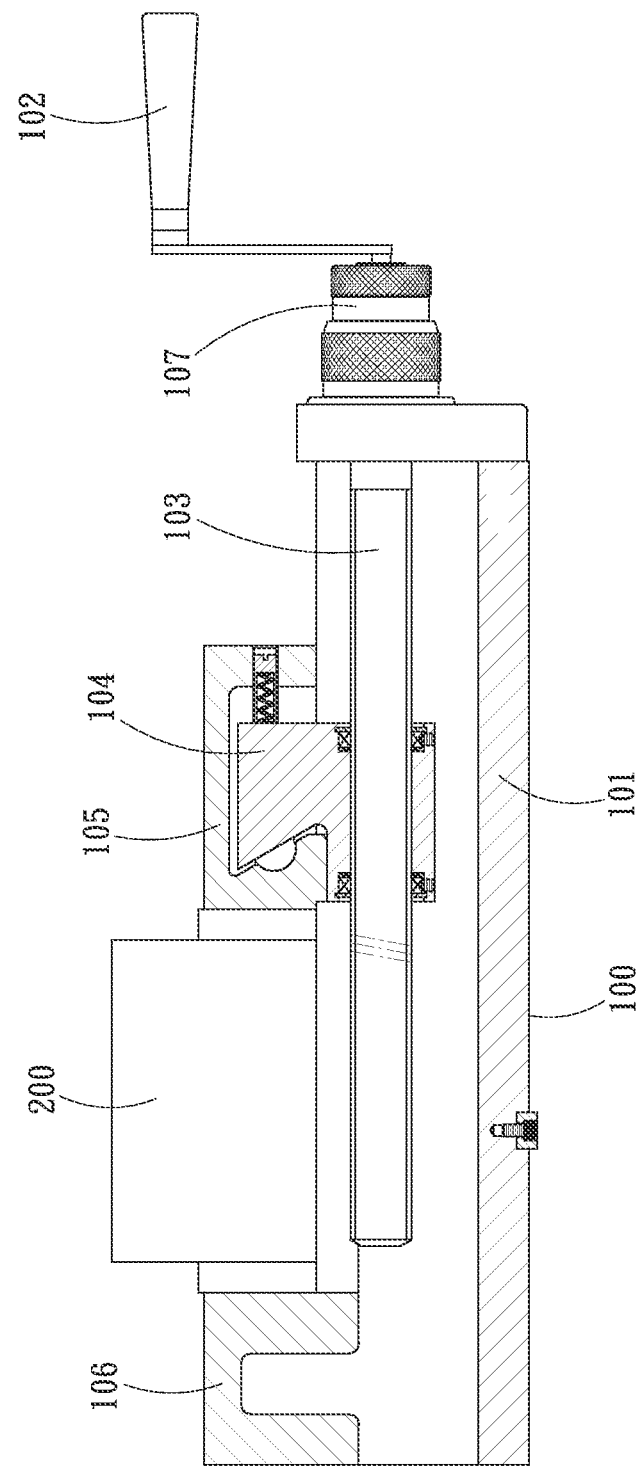
FIG. 1 is a schematic diagram of the structure and operation mode of a conventional vise.
Figure 2:
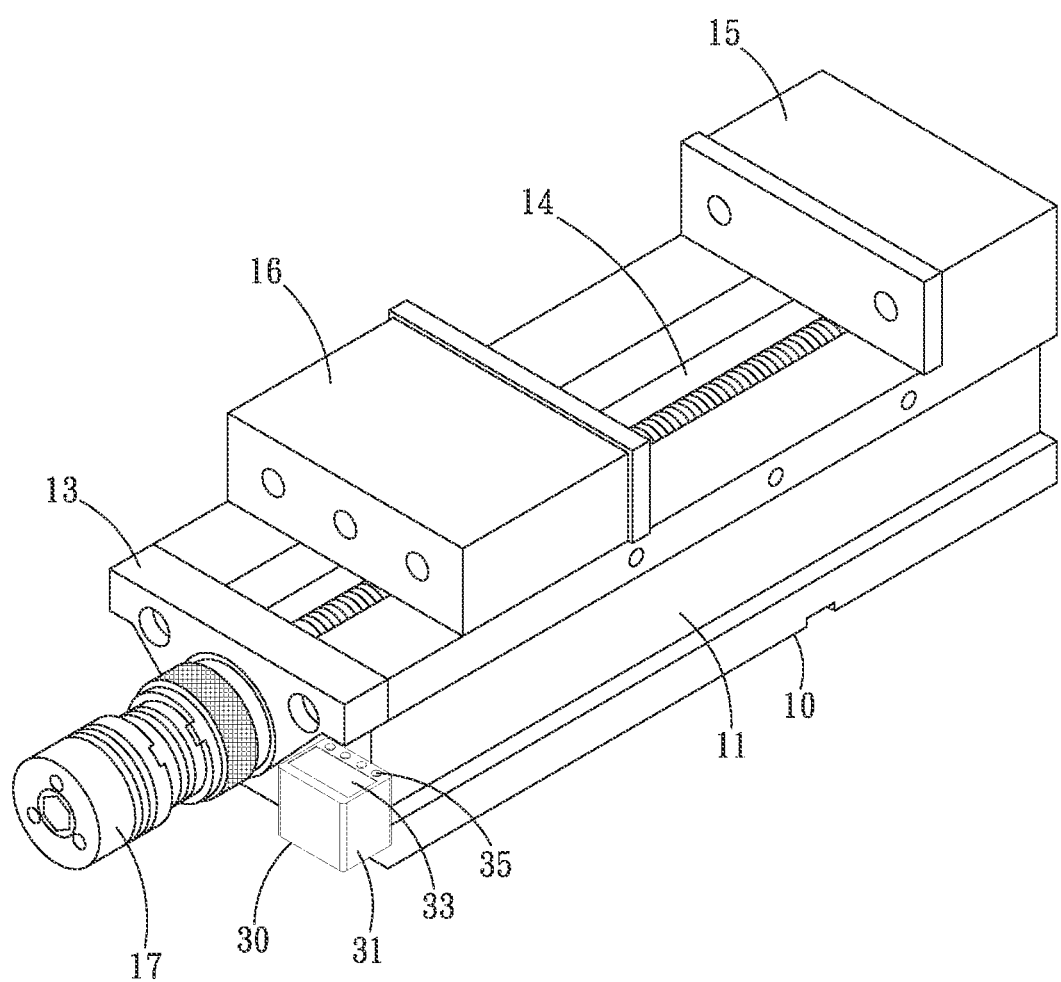
FIG. 2 is a three-dimensional schematic diagram of a preferred embodiment of a vise with a clamping force digital display mechanism of the present invention.
Figure 3:
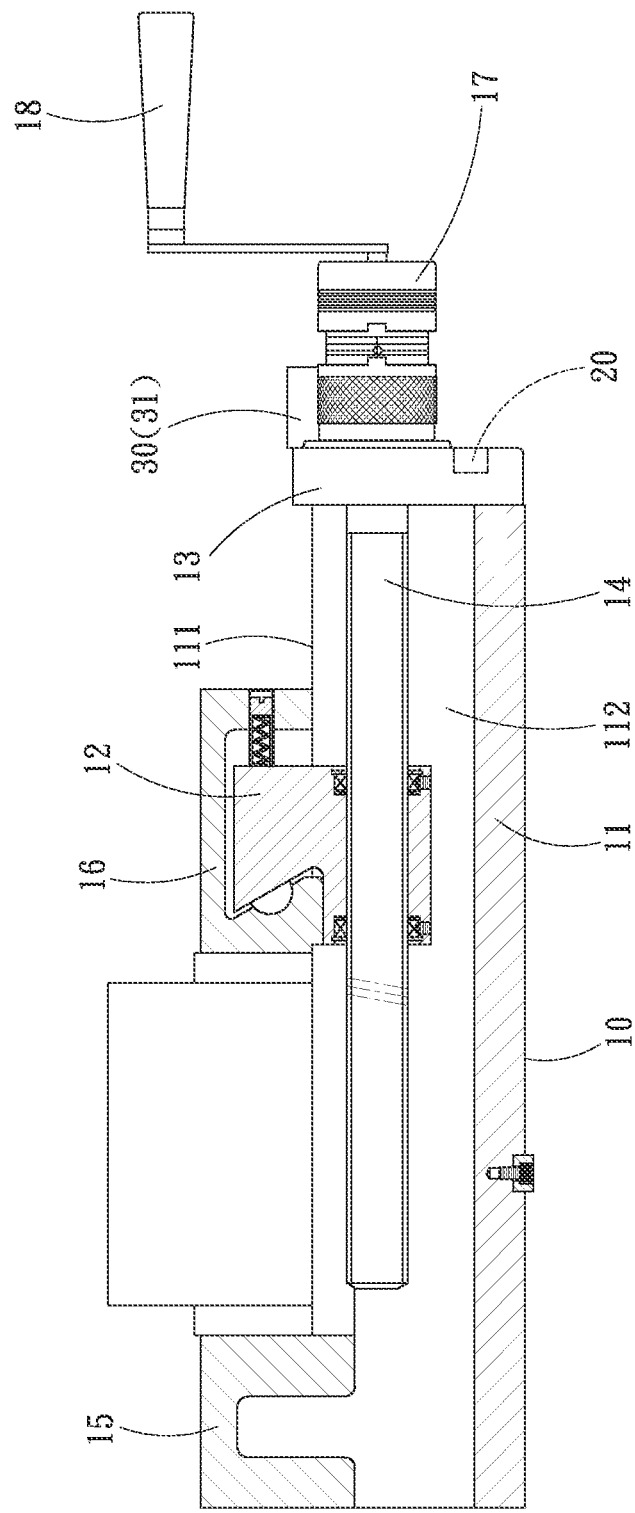
FIG. 3 is a schematic side view of the preferred embodiment of the vise with a clamping force digital display mechanism of the present invention.

Referring to FIG. 2 to FIG. 6, the vise of the present invention has a clamping force digital display mechanism, and its preferred embodiment comprises a vise 10, a sensor 20 and a digital display device 30. One of the preferred embodiments of the vise 10 comprises a vise body 11, a nut seat 12, a screw support seat 13, a screw 14 and two jaws 15, 16. The upper end of the vise body 11 has two sliding rails 111 extending parallel to the front and rear ends, and a receiving groove 112 extending to the front and rear ends is formed between the two sliding rails 111. The nut seat 12 is set in the receiving groove 112 of the vise body 11, so that the nut seat 12 can drive the jaw 16 to move forward and backward in the receiving groove 112. The screw support seat 13 is combined with the rear end of the vise body 11 through a screw locking structure, and is used as a fulcrum for supporting the rotation of the screw 14. The screw 14 is passed through the screw support seat 13, so that the shaft of the front end of the screw 14 is screwed on the nut seat 12, and the rear end of the screw 14 protrudes behind the screw support seat 13, and when the screw 14 rotates, it can drive the nut seat 12 to move forward and backward.

One of the two jaws 15, 16 is fixedly combined on the two sliding rails 111 at the front end of the vise body 11 as a fixed jaw, and the other jaw 16 is locked on the nut seat 12 by screws as a movable jaw. Furthermore, the vise 10 can also implement a supercharging device 17, the supercharging device 17 is an existing item, which can be an oil pressure supercharging mechanism, a mechanical multi-force supercharging mechanism, an air pressure supercharging mechanism or a screw supercharging mechanism institution or other structure etc. The supercharging device 17 is combined with the rear end of the screw 14, so that the operator can combine a handle 18 in the tool hole at the rear end of the supercharging device 17 to rotate the supercharging device 17 and the screw 14 synchronously, so that when the screw 14 rotates, it drives one of the jaws 16 to move on the vise body 10, so that the opening between the two jaws 15 and 16 can hold the workpiece.

The sensor 20 is set on the screw support seat 13 of the vise 10, specifically, it can be one of a pressure sensor, an inductive sensor or a capacitive sensor. The sensor 20 is used to sense the reaction force returned from the screw 14 to the screw support seat 13 when the screw 14 drives the jaw 16 to clamp the workpiece, and then the sensor 20 generates a signal. The digital display device 30 is connected to the sensor 20 through a signal line 40 for receiving the signal of the sensor 20, and displays the value of the clamping force of the vise 10 at that time after processing the signal.

Figure 4:
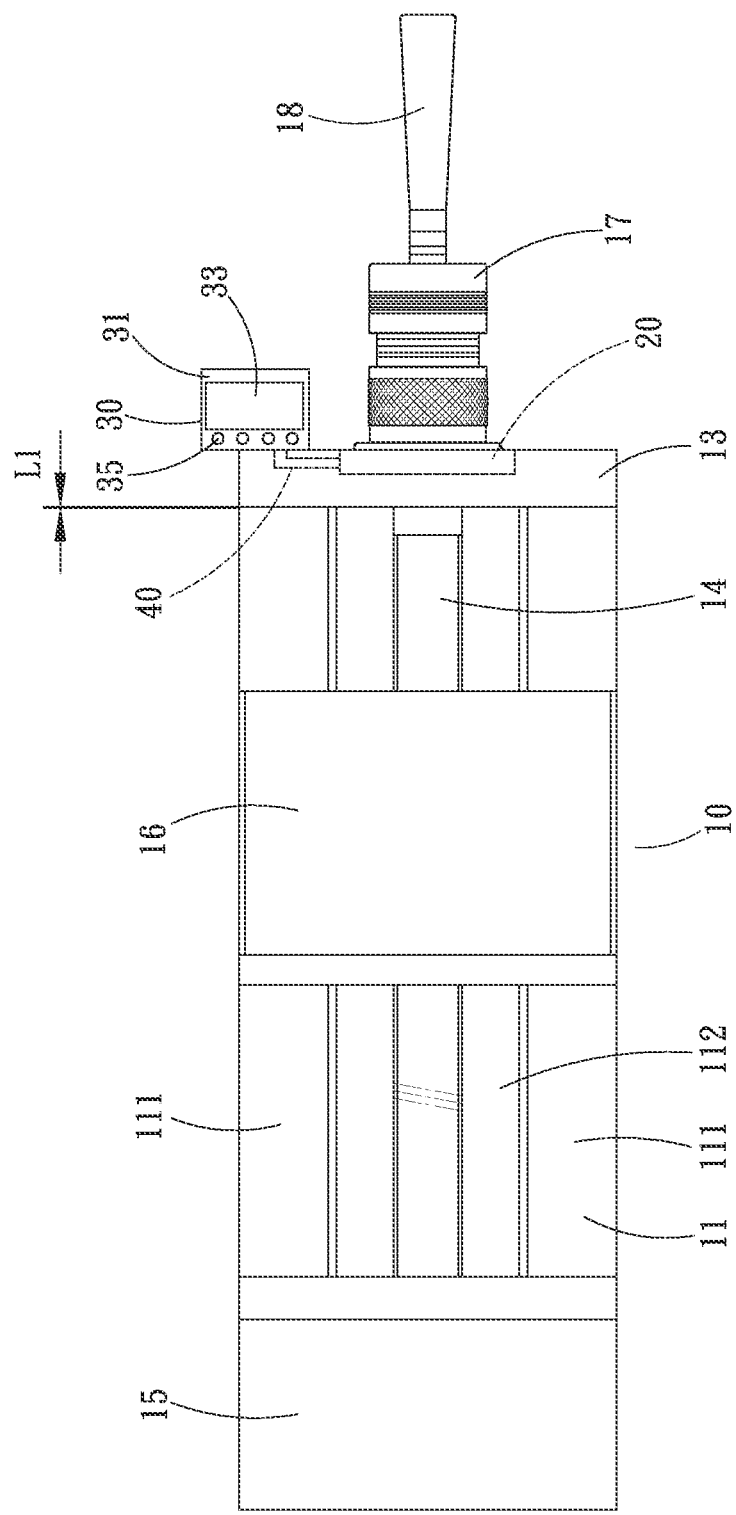
FIG. 4 is a schematic top view of the preferred embodiment of the vise with a clamp force digital display mechanism of the present invention.
Figure 5:
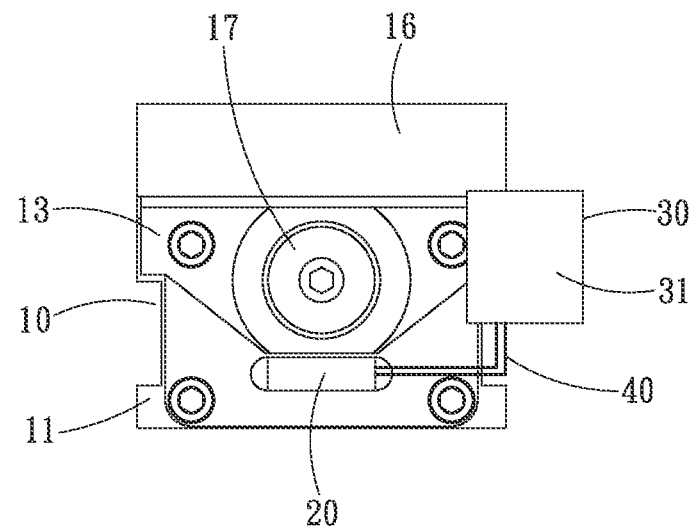
FIG. 5 is a schematic rear view of the preferred embodiment of the vise with a clamp force digital display mechanism of the present invention.
Figure 6:
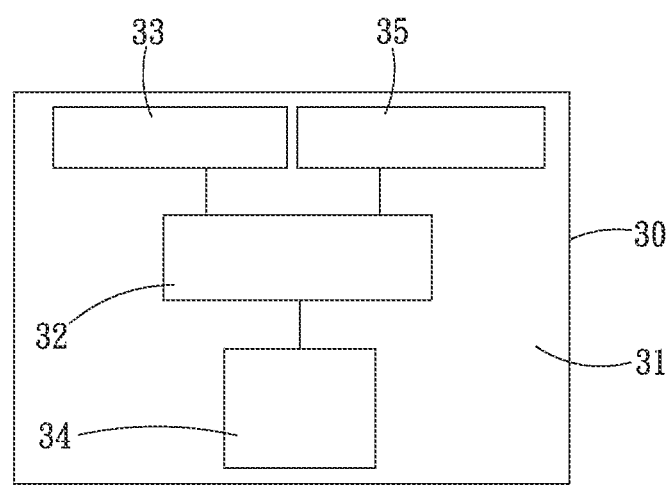
FIG. 6 is a schematic block diagram of each unit of the digital display device of the present invention.

Referring again to FIG. 4 and FIG. 6, the preferred embodiment of the above-mentioned digital display device 30 comprises a casing 31, and a control unit 32, a display unit 33, a power supply unit 34 and a control interface 35 arranged in the casing 31. The casing 31 is waterproof and dust proof and fixed on the back end of the vise body 10 or the screw support seat 13 (as shown in FIG. 4), so that the operator can obtain a better viewing effect. The control unit 32 is the core for signal processing and calculation, and mainly has a circuit board and a processor (IC). The display unit 33 is one of LCD, LED or OLED displays or other displays, and is used to display the value of the clamping force of the vise 10. The power supply unit 34 has a battery and a power connector for connecting to an external power supply, providing the power required by the sensor 20 and the digital display device 30. The control interface 35 can be a button interface or a touch interface, providing operations to activate, deactivate and set the digital display device 30 of the present invention, such as switching the displayed value of pressure, etc.

When the vise with a clamping force digital display mechanism of the present invention is used, through the sensor 20 and the digital display device 30 arranged in the vise 10, it can provide that when the operator uses the vise 10 to clamp the workpiece, when the sensor 20 senses that the screw 14 drives the jaw 16 to clamp the workpiece, the reaction force from the screw 14 is transmitted back to the screw support seat 13 so that the screw support seat 13 undergoes deformation or displacement L1 (as shown in FIG. 4), and at the same time, the sensor 20 continuously senses its deformation or displacement L1 to generate signal and feed back to the digital display design 30. The digital display design 30 obtains the signal from the sensor 20, processes and calculates it immediately through the processor (IC) of its control unit 32, obtains the value of the clamping force of the vise 10, and the display unit 33 composed of LCD, LED or OLED display shows the clamping force value of the vise at that time.

Therefore, the present invention allows the operator to directly watch the digital display design 30 to perform the action of turning the handle 18, and the rotation can be stopped after reaching the set clamping force value. Therefore, the present invention can improve the disadvantage of the conventional vise that controls the clamping force only based on the operator's experience or hand feel, so that the vise 10 of the present invention can fix the workpiece with precise and appropriate clamping force, and prevent the workpiece from being deformed due to excessive clamping force, or the workpiece from loosening and shifting due to too small clamping force.

The vise 10 of the present invention is not limited to the vise with the supercharging design 17 mentioned above, any existing vise with clamping parts of the acting force/reaction force structure can be implemented. According to the present invention, the digital display design 30 has the design of casing 31, control unit 32, display unit 33, power supply unit 34 and control interface 35 and can be fixed on the vise, and then the above sensor 20 can be installed on the screw support seat 13 of the vise 10. It can enable the existing vise to realize the digital display function of clamping force, and improve the shortcomings of conventional vises that only rely on the operator's work experience or hand feeling to control the vise's clamping force.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A vise with a clamping force digital display mechanism, comprising:
a vise, said vise comprising a vise body, two jaws set on said vise body for clamping a workpiece, a screw support seat incorporated in a back end of said vise body and a screw rotatably mounted on said screw support seat, said screw driving at least one said jaw to move on said vise body when said screw turns;

a sensor set on said screw support seat of said vise and used to sense the deformation or displacement that occurs when said screw drives said jaws to clamp the workpiece from the screw reaction force back to said screw support seat and continuously detect and generate a signal; and a digital display device connected to said sensor through a signal line, said digital display device being used to continuously receive said signal of said sensor, and display the clamping force value of said vise at that time after processing said signal.

2. The vise with a clamping force digital display mechanism as claimed in claim 1, wherein said is a pressure sensor that detects pressure.

3. The vise with a clamping force digital display mechanism as claimed in claim 2, wherein said digital display design comprises a control unit, a display unit connected to said control unit, a power supply unit connected to said control unit, and a control interface connected to said control unit.

4. The vise with a clamping force digital display mechanism as claimed in claim 3, wherein said digital display device comprises a casing selectively fixed on said vise body or said screw support seat, and said control unit, said display unit, said power supply unit and said control interface are set in said casing.

5. The vise with a clamping force digital display mechanism as claimed in claim 4, wherein said display unit is selectively a LCD display, a LED display or an OLED display.

6. The vise with a clamping force digital display mechanism as claimed in claim 4, wherein said casing of said digital display device is a waterproof and dustproof casing.

7. The vise with a clamping force digital display mechanism as claimed in claim 5, wherein said power supply unit comprises a battery.

8. The vise with a clamping force digital display mechanism as claimed in claim 5, wherein said power supply unit comprises a power connector for connecting to an external power source.

* * * * *